United States Patent
Ritz et al.

(10) Patent No.: US 9,367,854 B1
(45) Date of Patent: Jun. 14, 2016

(54) METHODS AND A COMPUTING DEVICE FOR CARRYING OUT DATA COLLECTION

(71) Applicant: WORKIVA INC., Ames, IA (US)

(72) Inventors: Dean Anthony Ritz, Vashon, WA (US); Christian Plazas, Midland, GA (US); Jacob Caban-Tomski, Denver, CO (US); Matthew Sanders, Highlands Ranch, CO (US); Matthew Keller, Ankeny, IA (US)

(73) Assignee: Workiva Inc., Ames, IA (US)

( * ) Notice: Subject to any disclaimer, the term of this patent is extended or adjusted under 35 U.S.C. 154(b) by 0 days.

(21) Appl. No.: 14/722,456

(22) Filed: May 27, 2015

Related U.S. Application Data

(60) Provisional application No. 62/140,753, filed on Mar. 31, 2015.

(51) Int. Cl.
| | | |
|---|---|---|
| *G06F 17/00* | (2006.01) | |
| *G06Q 30/02* | (2012.01) | |
| *G06Q 10/10* | (2012.01) | |
| *H04L 29/08* | (2006.01) | |
| *G06F 17/24* | (2006.01) | |
| *G06F 17/30* | (2006.01) | |

(52) U.S. Cl.
CPC .......... *G06Q 30/0203* (2013.01); *G06Q 10/107* (2013.01); *H04L 67/02* (2013.01); *G06F 17/243* (2013.01); *G06F 17/30557* (2013.01); *G06F 17/30569* (2013.01)

(58) Field of Classification Search
CPC ............ G06F 17/243; G06F 17/30557; G06F 17/30569
See application file for complete search history.

(56) References Cited

U.S. PATENT DOCUMENTS

| | | | |
|---|---|---|---|
| 7,072,822 B2 | 7/2006 | Humenansky et al. | |
| 7,085,734 B2 | 8/2006 | Grant et al. | |
| 7,512,451 B2 | 3/2009 | Detzler et al. | |
| 7,818,678 B2 | 10/2010 | Massand | |
| 8,161,527 B2 | 4/2012 | Curren | |
| 8,239,760 B2 | 8/2012 | Hanson et al. | |
| 8,280,865 B1 | 10/2012 | Edelman et al. | |
| 8,606,855 B2 | 12/2013 | Bhogal et al. | |
| 2003/0041077 A1* | 2/2003 | Davis .................. | G06F 17/2247 715/205 |

(Continued)

OTHER PUBLICATIONS

Assurance Reporting for XBRL: XARL (extensible assurance reporting language), 2003, Boritz et al., Bryant College, p. 17-31.*

(Continued)

*Primary Examiner* — Andrew McIntosh
(74) *Attorney, Agent, or Firm* — Drinker Biddle & Reath LLP

(57) ABSTRACT

According to an implementation, a host computing device receives, from a first computing device, a data collection request of a first user. The data collection request indicates a data point (whose characteristics are defined in a mark-up language schema) that is to be the subject of the data collection and identifies a second user as provider of a value for the data point. The host computing device notifies the second user of the data collection request and receives, from a second computing device, a request of the second user for the data point to be assigned a plurality of categories. In response to the request of the second user, the host computing device extends the mark-up language schema to characterize the plurality of categories within the mark-up language schema.

26 Claims, 5 Drawing Sheets

(56) References Cited

U.S. PATENT DOCUMENTS

| | | | |
|---|---|---|---|
| 2004/0138942 A1 | 7/2004 | Pearson et al. | |
| 2006/0064434 A1 | 3/2006 | Gilbert et al. | |
| 2006/0112123 A1* | 5/2006 | Clark | G06F 17/246 |
| 2008/0066067 A1 | 3/2008 | Stimpson et al. | |
| 2008/0270312 A1* | 10/2008 | Ohata | G06Q 10/10 |
| | | | 705/76 |
| 2009/0006472 A1* | 1/2009 | Bush | G06F 17/2247 |
| 2009/0019358 A1* | 1/2009 | Blake | G06F 17/2247 |
| | | | 715/234 |
| 2013/0218829 A1 | 8/2013 | Martinez | |
| 2013/0283147 A1 | 10/2013 | Wong et al. | |
| 2014/0114970 A1* | 4/2014 | Prabu | G06F 17/30554 |
| | | | 707/736 |
| 2014/0149857 A1 | 5/2014 | Vagell et al. | |
| 2014/0304009 A1* | 10/2014 | Saxon | G06Q 40/08 |
| | | | 705/4 |

OTHER PUBLICATIONS

Calvo et al., "Collaborative Writing Support Tools on the Cloud," IEEE Transactions on Learning Technologies, vol. 4 (1), Jan.-Mar. 2011, pp. 88-97.

* cited by examiner

METHODS AND A COMPUTING DEVICE FOR CARRYING OUT DATA COLLECTION

CROSS-REFERENCE TO RELATED APPLICATIONS

This application claims the priority benefit of U.S. Provisional Patent Application No. 62/140,753, filed on Mar. 31, 2015, which is incorporated herein by reference.

TECHNICAL FIELD

The present disclosure is related generally to data collection techniques and, more particularly, to the collection of data in the context of a schema-based data system.

BACKGROUND

Business reports pull together information from a variety of sources. Some of these sources are people who themselves are part of a chain of persons assembling and analyzing data. For example, an income statement (a typical summary report for a company) may provide just a few dozen data values. These values, however, may be the result of summarizing, through both manual and automated methods, more than 100,000 finer-grained data values.

A report creator has the task of gathering as well as organizing the data for a report. The gathering often requires acquiring data not just from computer software systems (e.g., accounting systems) but also from persons who themselves have gathered data from computer software systems and from other persons. Traditionally, this data collection process is carried out as follows: a person (the "data requester") sends an email containing the request to one or more people ("data providers") who may be able to satisfy the request. Sometimes the email includes an attached spreadsheet. The data provider downloads the spreadsheet, enters in the requested information, re-attaches the edited version of spreadsheet to a responsive email, and sends the responsive email to the requester.

DRAWINGS

While the appended claims set forth the features of the present techniques with particularity, these techniques, together with their objects and advantages, may be best understood from the following detailed description taken in conjunction with the accompanying drawings of which:

DESCRIPTION

Figure 1:
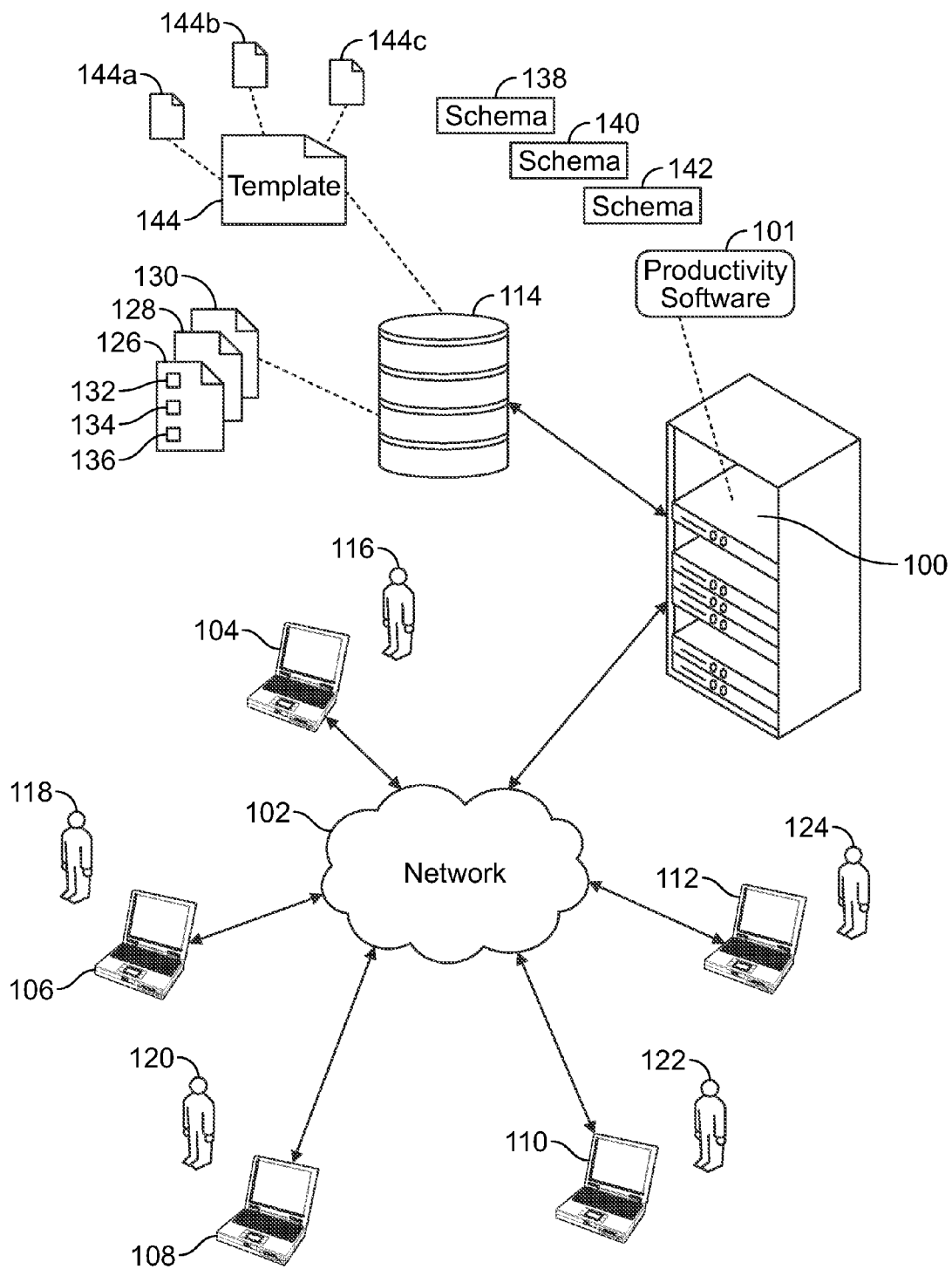
FIG. 1 depicts a computing environment in which various embodiments may be implemented.

The present disclosure is generally directed to methods and a computing device for carrying out data collection. According to an embodiment, a host computing device receives, from a first computing device, a data collection request of a first user (e.g., made via a document, such as a spreadsheet, in which the first user is currently working). The data collection request indicates a data point (whose characteristics are defined in a mark-up language schema) that is to be the subject of the data collection and identifies a second user as provider of a value for the data point. The host computing device notifies (e.g., via a task list displayed when the second user logs in or via an email containing a link) the second user of the data collection request and receives, from a second computing device, a request of the second user for the data point to be assigned a plurality of categories (e.g., the spreadsheet cell for "travel" to be broken up into ground transportation, meals, airfare, and hotel). In response to the request of the second user, the host computing device extends the mark-up language schema to characterize the plurality of categories within the mark-up language schema (e.g., adds the appropriate elements for ground transportation, meals, airfare, and hotel to the schema under the "budget" element). The host computing device also receives, from the second computing device, a request of the second user to forward the data collection request. The forwarding request identifies a third user and indicates a category of the plurality of categories for which the third user is to be a provider for the data collection request (e.g., airfare). In response, the host computing device notifies the third user of the forwarded request.

As used herein, a "data point" means a piece of data minimally representing a single value. A data point may be associated with specific human-understandable meaning through the use of metadata. For example, metadata associated with a data point could indicate that the data point represents "current assets." In other examples, the metadata could indicate one or more of a period of time or moment in time to which the value pertains, a data type, a confidentiality requirement and—if numeric—numeric properties such as a unit of measure or precision. In still other examples, the metadata could indicate parameters that require the collection of other data points such as attachments of documentary evidence or commentary if, for example, the value falls outside the parameters. "Data" as used herein refers to both a single datum as well as multiple data.

As used herein, a "data requester" or "requester" is a person or computing process that defines a data collection template or invokes the distribution of one or more data collection templates to at least one data provider.

As used herein, a "data provider" or "provider" is a person, or computing process that receives a request for at least one data point and is assumed capable of satisfying the request.

As used herein, an "approver" of a data point is a person whose role is to inspect a value that has been submitted for the data point. The approver may accept or reject the value. Not all data points have approvers, and any given data point may have more than one approver. A requester for a data point may also be an approver for that data point. Alternatively, a requester may be restricted from simultaneously holding both roles for the same data point.

As used herein, a "gate" is a stage in a data collection process at which a value entered in response to a data collection is prevented from being made available to a requester. "Gating" refers to the act of withholding the value from the requester. An approver has the authority to "open" the gate to allow the value to reach the requester.

As used herein, a "data collection template" or "template" is a description (e.g., a mark-up language document) of an electronic form representing one or more data points to be collected. This description may include properties such as properties of data points for which collection is being requested, labels, a list of responses for declining the collection request, permissions, visual layout, and a reference to a parent data collection template (if the data collection template is a derivative of another data collection template).

As used herein, "delegation" is the act of a data provider forwarding a request to another data provider while remaining in the collection chain.

As used herein, "reassignment" is the act of a data provider forwarding a request to another data provider. In contrast to delegation, however, the data provider removes himself from the collection chain.

As used herein, "extended data collection template" or "extended template" is a data collection template whose description is a derivative of another data collection template.

As used herein, a "mark-up language schema" or "schema" is a set of computer-readable instructions that describes terms and relationships between terms (such as the semantic relationships among the terms). Examples of such relationships include "kind of" relationships and mathematical relationships (such as a summation, an average, a mean, or a user-defined formula).

As used herein, "extending" a schema refers to adding one or more elements to the schema. Examples of extending a schema include: adding a new neighbor element (leaf node), adding a new child element that refines an existing element (e.g., adding to "travel" the sub-elements of airfare, ground transportation, hotel, and meals), and adding a new element that groups together existing elements (e.g., add "travel" to group together airfare, ground transportation, hotel, and meals).

The term "data entity" as used herein refers to a separately accessible collection of data that resides in a database, such as an "object" within an object-oriented database or an "entity" on the Google App Engine™ platform. A data entity may contain one or more "assets." Each asset within a data entity is associated with an asset identifier, which may also be a a globally unique identifier ("GUID"). The user content of an asset is referred to herein as a "value." A value can be a numerical value (e.g., an integer or floating-point decimal number), an alphanumeric character, a block of alphanumeric characters, or other syntax. A value can be human-readable content or non-human-readable content.

Various embodiments of the disclosure are implemented in a computer networking environment. Turning to FIG. 1, an example of such an environment is shown. A host computing device 100 is communicatively linked to a network 102. Possible implementations of the network 102 include a local-area network, a wide-area network, a private network, a public network (e.g., the Internet), or any combination of these. The host computing device 100 executes productivity software 101. The network 102 may include both wired and wireless components. Also communicatively linked to the network 102 are a first computing device 104, a second computing device 106, a third computing device 108, a fourth computing device 110, and a fifth computing device 112. The host computing device 100 is communicatively linked to a media storage device 114 (e.g., a redundant array of independent disks or other computer-readable memory). For the sake of example, it is assumed that a first user 116 operates the first computing device 104, a second user 118 operates the second computing device 106, a third user 120 operates the third computing device 108, a fourth user 122 operates the fourth computing device 110, and a fifth user 124 operates the fifth computing device 112.

The host computing device 100 is depicted as a rack-mounted server, while the rest of the computing devices are depicted as notebook computers. However, the computing devices depicted in FIG. 1 are merely representative. Other possible implementations of a computing device include a tablet computer, a desktop computer, and a smartphone.

Under the control of the productivity software 101, the host computing device 100 interacts with the computing devices 104, 106, 108, 110, and 112 to allow those computing devices to access one or more data entities stored on the media storage device 114. The data entities are represented in FIG. 1 by a first data entity 126, a second data entity 128, and a third data entity 130. Each data entity may contain one or more assets, represented in FIG. 1 by a first asset 132, a second asset 134, and a third asset 136.

According to various embodiments, the host computing device 100 acts as a server to many clients, including the first computing device 104, the second computing device 106, the third computing device 108, the fourth computing device 110, and the fifth computing device 112. To access the host computing device 100, according to an embodiment, a given computing device establishes a secure communication session with the host computing device 100 using the security credentials of the user of the computing device. The productivity software 101 may authenticate the user (and possibly the computing device as well) in any of a variety of ways, such as by requiring a user name and a password or by a single-sign-on method.

In an embodiment, the first computing device 104, the second computing device 106, the third computing device 108, the fourth computing device 110, and the fifth computing device 112 communicate with one another via the host computing device 100 and the productivity software 101. Similarly, the productivity software 101 is capable of notifying a given user when a data collection event has occurred. For example, the productivity software 101 can send an email to the user containing a link that, when activated (e.g., clicked), causes the user's computing device to request a web page via the network 102. The productivity software 101 delivers the web page to the computing device (either directly or via other computing devices, such as a separate web server). The web page includes a notification (e.g., on a task list) when, for example, a data point has been requested from the user. For example, the next time the second user 118 logs into the productivity software 101, the web page alerts the second user 118 that there is a data collection request (e.g., via the task list). Other possible ways that notification can be carried out include: the productivity software 101 emailing a link to the second user 118, the productivity software 101 transmitting a text message to the second user 118's cell phone, and the productivity software 101 posting a message on a data collection dashboard that the productivity software 101 provides to the second computing device 106. Thus, when the present disclosure refers to the productivity software 101 notifying a user, one or more of these methods are among those that may be used.

Similarly, the first computing device 104, the second computing device 106, the third computing device 108, the fourth computing device 110, and the fifth computing device 112 access the data entities or one or more assets within the data entities via the host computing device 100 and the productivity software 101. However, the host computing device 100 and the productivity software 101 permit and restrict access to any given asset based on a set of permissions that are established by the owner of the asset (e.g., by the user who initiates a data collection request).

For example, if the first user 116 (via the first computing device 104) sends a request to the productivity software 101 for the creation of a "Q2, FY 2009 travel expenses" data point (e.g., a particular cell in a spreadsheet having the appropriate semantic metadata), then the productivity software 101 instantiates an asset corresponding to the data point within the media storage device 114 and gives the first user 116 owner-level permissions with respect to the asset. Upon request from the first user 116, the productivity software 101 permits one or more other users to edit the asset (e.g., to persist a value in the asset for a requested data point) by giving such other users editing permissions. Furthermore, upon request from the first user 116, the productivity software 101 conditionally restricts edits to the asset (e.g., holding a value entered for that asset in a temporary data entity or temporary asset and refraining from persisting the value within the asset itself) on the condition of being approved by an approver. Additionally, the productivity software 101 may gate a value that is to be stored in the asset—preventing it from being accessed by the requester or preventing it from being made available to the requester—until it is approved by the approver. Approval may be withheld for various reasons including concern for its correctness or, in cases where a previously submitted value is amended, the approver's determination that the change is non-material. The identity of the approver may be designated by the first user 116.

In an embodiment, one or more of the assets is described by at least one schema. To help illustrate various examples, FIG. 1 depicts a first schema 138, a second schema 140, and a third schema 142. Each schema used to describe the assets is accessible to at least the productivity software 101 and, if granted sufficient permission by the productivity software 101, is accessible to the computing devices 104, 106, 108, 110, and 112. One or more of the schemas may be stored on the media storage device 114 while others may be stored, for example, on external websites. One or more of the schemas may be used to create a data collection template 144, whose purpose will be described below. A schema used for this purpose may be local to the data collection template 144 (e.g., not one hosted or provided by the organization). Once the data collection template is created, the local schema may be associated with elements in the organization's schema. This may be done using knowledge-organization relationships such as "same as" to indicate that a term in the local schema means the same as a term from another (presumed official) schema. In various embodiments, a schema or element thereof may be defined in another schema as specified by the element's uniform resource locater, which is resolvable by the productivity software 101. For example, elements defined in the United States Generally Accepted Accounting Principles taxonomy may be used as schema terms.

In an embodiment, one or more of the schemas of FIG. 1 is an eXtensible Business Reporting Language ("XBRL") taxonomy whose baseline content is derived from one or more standard XBRL taxonomies. Such schema includes a set of instructions that are executable by the productivity software 101 to interpret one or more values of at least one of the assets (e.g., a value used to populate a cell in a table). For example, assume the first asset 132 has a value property of 25,011,000 and the following additional properties: schema element SalesRevenueServicesNet from the schema 138; a period of time property from 2014 Oct. 1 through 2014 Dec. 31; a precision property of 3 (i.e., rounded to the nearest thousand); and a unit of measure property of US dollar, and this asset is linked to a first schema 138. The productivity software 101 might process the first schema 138 to determine that the value "25,011,000" means it should be presented on a display prefixed with a "$" symbol; should be presented in thousands to indicate its level of precision, i.e., "25,011"; and should be followed by the text "thousand"; and should be presented with information on the time period (e.g., "Q4"). Further, schema 138 may provide additional information such as a standard label to be used with displaying the value (e.g., "Sales and Services Revenue, Net"). Thus productivity software may interpret the aggregate information of first asset 132 and first schema 138 to present first asset 132 on a display as "Sales and Services Revenue, Net, in Q4 of $25,011 thousand."

As will be described in further detail below, in various embodiments, the productivity software 101 may extend one or more of the schemas in response to a user (having the appropriate permissions) input during a data point collection.

Figure 2:
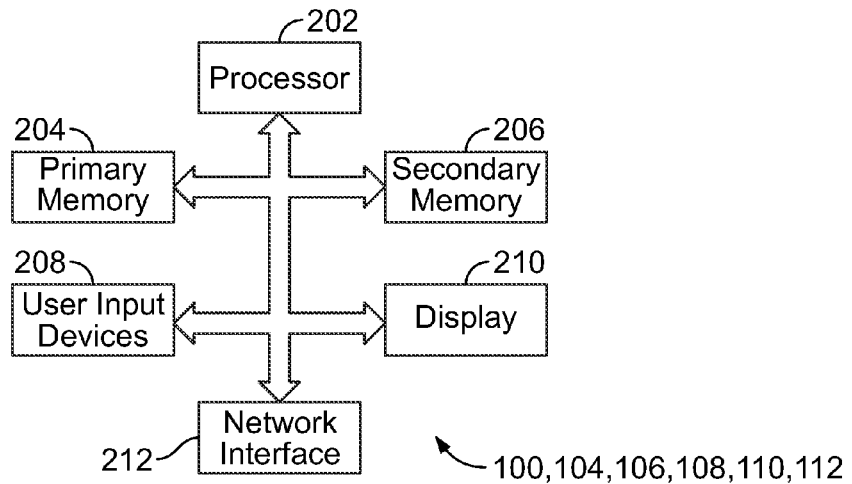
FIG. 2 depicts the architecture of a computing device according to an embodiment.

In an embodiment, one or more of the computing devices of FIG. 1 have the general architecture shown in FIG. 2. The device depicted in FIG. 2 includes a hardware processor 202 ("processor 202") (e.g., a microprocessor, controller, or application-specific integrated circuit), a primary memory 204 (e.g., volatile memory, random-access memory), a secondary memory 206 (e.g., non-volatile memory), user input devices 208 (e.g., a keyboard, mouse, or touchscreen), a display 210 (e.g., an organic, light-emitting diode display), and a network interface 212 (which may be wired or wireless). The memories 204 and 206 store instructions and data. The processor 202 executes the instructions and uses the data to carry out various procedures including, in some embodiments, the methods described herein.

Processes used to carry out data collection in accordance with various embodiments will now be described with reference FIG. 3 through FIG. 6. In the description of each of the figures, reference will be made to the computing environment of FIG. 1 in order to show possible ways that various processes may be implemented. It is to be understood, however, that there may be other ways to carry out each of the actions, and that computing devices other than those described may perform the actions. For example, in some embodiments, the actions are carried out by computing devices that are in a peer-to-peer relationship and not necessarily by a single host device. Furthermore, for the sake of clarity, the description of these figures will often refer to the collection of a value (singular) for a data point (singular) from a provider (singular). However, the same process may be carried out to collect values for multiple data points or to collect values from multiple providers, and such singular references are being used here only for the purpose of avoiding having to repeat both singular and plural references.

Figure 3:
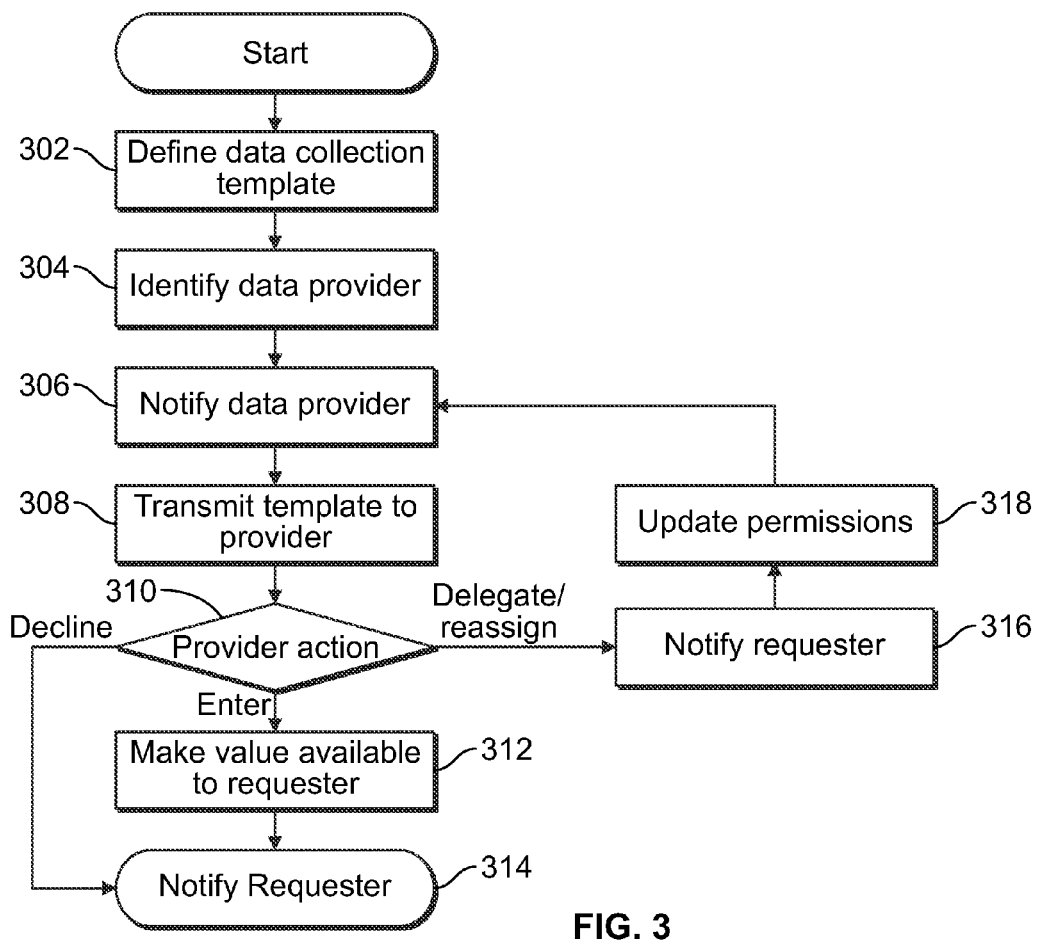
FIG. 3 depicts a data collection process according to an embodiment.

Turning to FIG. 3, a process carried out to collect data (including delegating or reassigning a data collection) in accordance with an embodiment is described. At 302, a data collection template is defined. For example, the first user 116 interacts with a web-based user interface (provided by the productivity software 101 and displayed by the first computing device 104) to request that the productivity software 101 create a document collection template. The productivity software 101 receives the request from the first computing device 104. In response, the host computing device 100 instantiates a data collection template 144. As part of this process, the first user 116 can indicate to the productivity software 101 a data point that is to be collected. The productivity software 101 instantiates the first asset 132 to hold a value and metadata for the data point that is the subject of the collection. The data collection template 144 (e.g., a mark-up language document such as an XML document) includes a specification that tells the productivity software 101 what user content to display to a data provider during the data collection process, how to display it, and what sort of data entry fields and prompts to display to the provider to allow the provider to enter a value or values for any data point being requested. The user content may include data labels, data entry fields, a time period for each requested data point (e.g., as of 2014 Dec. 31, for the period from 2014 Oct. 1 through 2014 Dec. 31). The data collection template 144 may also include other information such login instructions and entry instructions.

In some embodiments, the data collection template is created as part of a dedicated data collection process. In other embodiments, the data collection template is created as a side task of a document generation process. For example, a user could assign out portions of a document for data collection (e.g., select a range of cells of a spreadsheet and request, from a data provider, data needed to populate those cells). For example, assume that the first user 116 is working in a document (hosted by the host computing device 100) that is to be incorporated into a first quarter report. Through the use of special fields or codes, the first user 116 leaves certain parts of the report (e.g., earnings) as "blanks" or placeholders for data points that are to be collected. The first user 116 might (e.g., through a pop-up menu) request a data collection for one or more of these placeholders. In response, the host computing device 100 might instantiate the data collection template 144.

At 304, a data provider is identified for the data point. For example, the first user 116 interacts with the web-based interface to identify the second user 118 to be a data provider for the data point. The productivity software 101 receives this identifying information from the first computing device 104 and, in response, sets the permission of the first asset 132 so that second user 118 has editing permissions with respect to it. The productivity software 101 stores information regarding this request in the media storage device 114. Such information may include one or more of the identity of the data provider (or providers if there are multiple data providers), an indication of how the data provider is to be notified, a time stamp indicating the date and time the request was entered by the requester, and a due date by which the data provider is to respond.

In various embodiments, blocks 302 and 304 are carried out until the data requester has indicated all of the data points to be collected and has identified the provider or providers for each of the data points.

At 306, the data provider is notified regarding the collection. For example, the productivity software 101 notifies the second user 118 using one or more of the notification techniques previously discussed. As noted before, there may be multiple providers, each of whom may be notified during this block.

At 308 the data collection template is transmitted to the data provider who was identified by the data requester. For example, the second user 118 activates (e.g., clicks on) a link in an email that the productivity software 101 sends to the second computing device 106. In response, a web browser executing on the second computing device 106 requests and obtains a login page from the productivity software 101. Alternatively, the second user 118 may have already logged in to the productivity software 101 and be notified via a task list that includes the request. The second user 108 could open the request from the list. In response to the provider opening the request, a visual representation of the data collection template is delivered to the provider. For example, once the second user 118 opens the request, the productivity software 101 transmits one or more of a web page and drawing instructions having a visual representation of the template 144 (e.g., a web page, an Adobe® Flash® rendering, or a hypertext mark-up language rendering) to the second computing device 106.

In an embodiment, the visual representation presented to the second user 118 shows only those portions of the template for which the first user 116 has authorized the second user 118 to view (e.g., only those for which the second user 116 is a provider or an approver). All other data points represented in the template may, for example, be hidden so that the second user 118 is not informed that they exist or "grayed out" so that the second user 118 could view but not edit them. For example, assume that the first user 116 is assembling a spreadsheet hosted by the productivity software 101 and wishes to carry out data collection in order to populate five particular cells. The first user 116 might (e.g., through a series of menus) request data collection from the second user 118 as to two of those cells and request data collection from the third user 120 as to three of those cells. The productivity software 101 might transmit a visual representation of the template 144 to each of those users, but customize the representation for each of those users—sending the second user 118 a representation of the template showing only the two cells for which the second user 118 is being asked to provide values and sending the third user 120 a representation of the template showing only the three cells for which the third user 120 is being asked to provide values.

Subsequent actions taken depend on the actions taken by the data provider at 310. If the data provider enters a value for the requested data point, then the process moves to 312, at which the value is made available to the requester, and then to 314, at which the data requester is notified of the response to the data collection request. For example, if the second user 118 has the requested value, then the second user 118 uses the visual representation of the template 144 to enter the value into the appropriate data entry field on the second computing device 106. The second computing device 106 transmits the value to the productivity software 101. The productivity software 101 receives the value and stores the value within the first asset 132. The productivity software 101 then notifies the first user 116 using one or more of the previously-described techniques.

If, at 310, the data provider declines to enter a value and optionally provides an explanation for the declination possibly from a list of predefined responses from the data collection template, then the process moves to 314, at which the data requester is notified with said notification including the explanation, if any, that the request has been declined. For example, if the second user 118 is unable to supply a value and does not have permission to delegate or reassign the request, the second user 118 may decline the request (e.g., via a control or menu on the visual representation of the template 144). If the data collection request is for multiple data points, the second user 118 might decline the request as to some of the data points and enter values as to other data points. The productivity software 101 notifies the first user 116 regarding the declination.

If, at 310, the data provider has permission to delegate or reassign the request—e.g., the requester has set the permissions for the data point (e.g., set the permissions for the asset or assets corresponding to the data point) in a way that permits the provider to delegate or reassign the data point, and the provider does delegate or reassign the request to another data provider, then the process moves to 316, at which the requester is notified of the delegation or the reassignment. For example, if the second user 118 does not have the requested value, the second user 118 might interact with the web interface (e.g., a pop-up menu next to an entry field) to indicate that a data point is to be delegated or reassigned to the third user 120. If the data collection request is for multiple data points, the second user 118 might decline the request as to some of the data points, enter values as to other data points, and delegate or reassign other data points (or any combination thereof). The second computing device 106 transmits an indication of the second user 118's delegation or reassignment to the productivity software 101. The productivity software 101 receives the indication and reacts by notifying the first user 114 of the delegation or reassignment at 316 (which may include identifying the third user 120 as the delegate or reassignee). The process then moves to 318, at which permissions for the data point are updated. For example, the productivity software 101 updates permissions on the first asset 132 (to give the third user 120 the ability to populate it). The process then moves back to block 306, with the second user 118 assuming the role of the data requester and the third user 120 assuming the role of the data provider.

Figure 4:
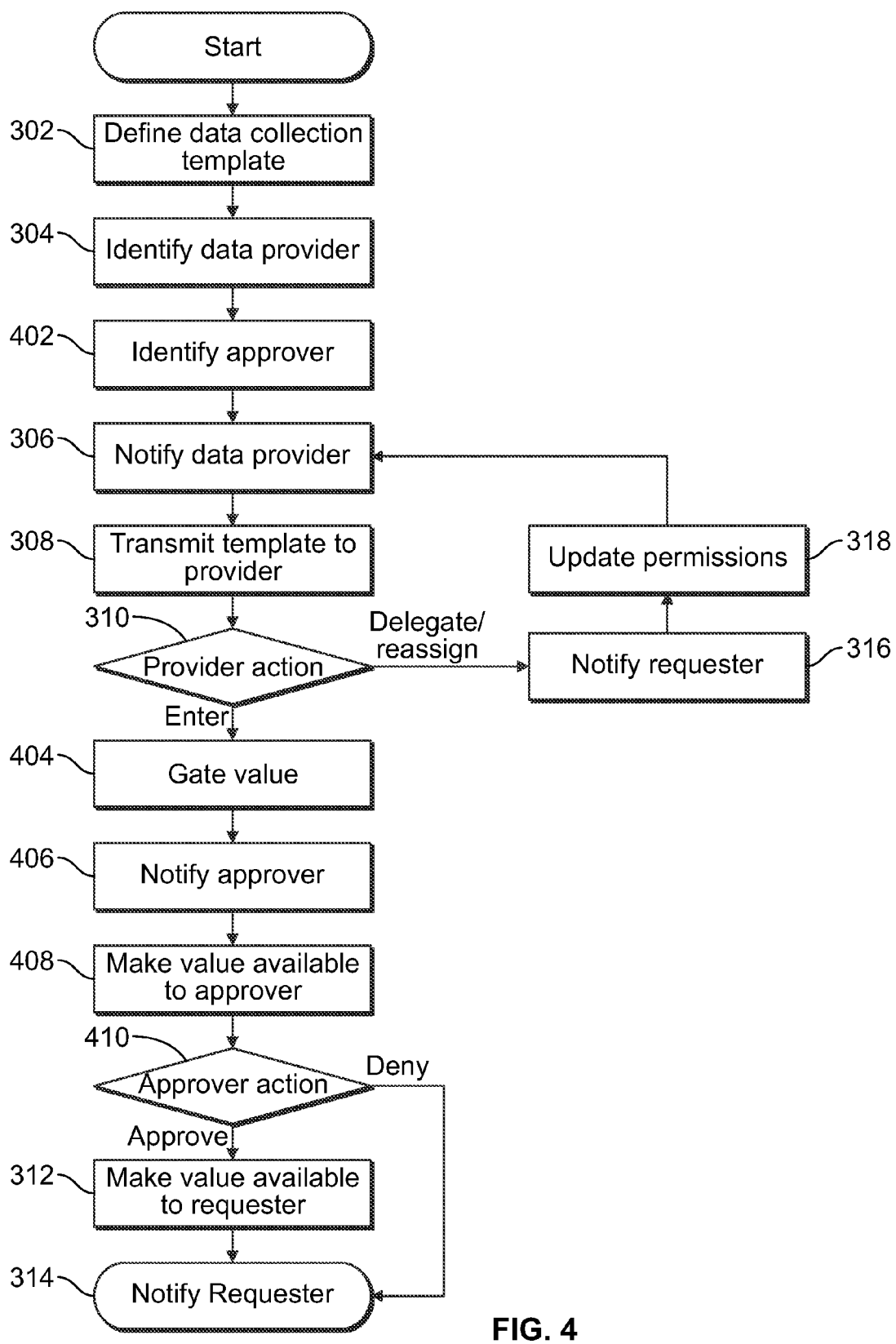
FIG. 4 depicts a data collection process according to another embodiment.

In an embodiment, data that the data provider provides is gated, and is not permitted to populate the data collection template until it is approved, such as by a third party. Turning to FIG. 4, an example of how this gating process occurs in an embodiment will now be described. Blocks 302, 304, 306, 308, 310, 312, 314, 316, and 318 represent the same possible sets of actions as their counterparts in FIG. 3. In this embodiment, however, there are the following differences. At 402, the data requester assigns a user to be an approver for the requested data point and a gate is created for the data point. There may be multiple approvers assigned, but the description of FIG. 4 will refer to a singular approval for the sake of clarity. For example, the first user 116 indicates (e.g., via the web interface on the first computing device 104) that the fourth user 122 is to be the approver for the data point (i.e., the data point for which the second user 118 is to be the provider). The first computing device 104 transmits this indication to the productivity software 101. The productivity software 101 stores, in the first asset 132, information regarding the identity of the approver (the fourth user 122) as well as the fact that there is a gate for the data collection process with respect to this data point in the first asset 132.

After the provider enters a value (after 310), the value is gated at 404, pending approval from the approver. At 406, the approver is notified. For example, the productivity software 101 sends a notification to the fourth user 122 that there is a data point collection response that needs the fourth user 122's approval. The productivity software 101 prevents the value entered (e.g., by the second user 118 or by the third user 120, if the request has been delegated) from being persisted in the first asset 132 until such approval.

At 408, the value is made available to the approver. For example, when the fourth user 122 opens the notification, such as by logging on to the productivity software 101 the productivity software 101 presents the fourth user 122 with a user interface (on the fourth computing device 110) that shows the value and gives the fourth user 122 the option of approving or rejecting the value. The user interface may also give the fourth user 122 the option to enter comments.

Subsequent actions taken depend on the actions taken by the approver at 410, and the possibilities (312 and 314) have been previously discussed. The notification to the data requester will indicate whether the approver has approved or denied the value, and give the requester the ability to view any notes that the approver entered. Also, the approval state will be stored as metadata in association with the value. For example, the productivity software 101 may store the approval or denial status (based on the response of the fourth user 122) as metadata in the first asset 132.

If the approver denies the value, the requester may revise the request and send the revised request back to the provider. In FIG. 4, for example, this might involve starting the process back at 302.

Figure 5A:
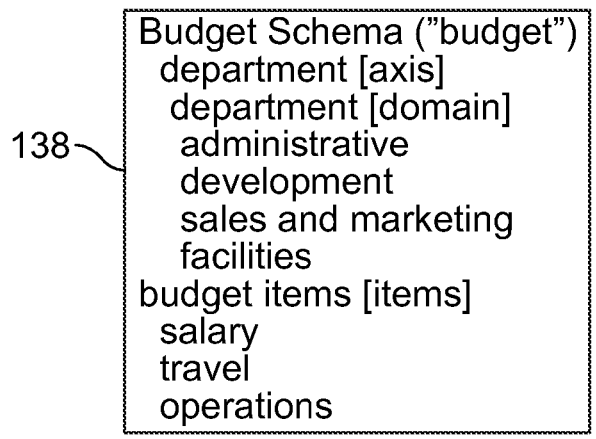
FIG. 5A depicts an example of a schema according to an embodiment.
Figure 5B:
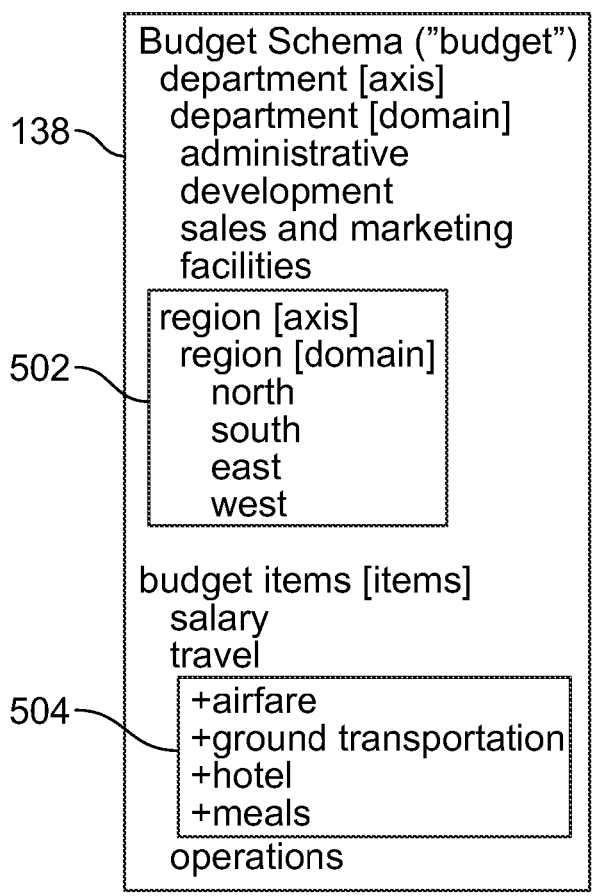
FIG. 5B depicts an example of an extension of the schema of FIG. 5A according to an embodiment.

Turning to FIGS. 5A and 5B, examples of implementations of a schema are shown. To assist in further examples, it will be assumed that these examples are implementations of the first schema 138 from FIG. 1. In FIG. 5A, the first schema 138 is shown as being implemented as a dimensional schema representing the idea of a budget. The first schema 138 has multiple elements for a budget, including the following budget items: salary, travel, and operations. The first schema 138 further describes a dimension, denoted by the suffix "[axis]," which represents the idea of a department, and a domain (range of values) denoted by the "[domain]" suffix, for the department. The "department" domain includes the specific departments of administrative, development, sales and marketing, and facilities. The first schema 138 may be implemented in any of a variety of mark-up languages including XML and XML-derived languages such as XBRL.

In an embodiment, the productivity software 101 is able to extend schemas, such as in response to the input of a user. To do so, the productivity software 101 adds additional elements in conformance with the schema syntax or specifies additional relationships between elements (e.g., a summation contributor to the value of the parent). For example, FIG. 5B depicts the first schema 138 after having been extended. In FIG. 5B, the productivity software 101 has added elements (block 502), including a new dimension (denoted by "axis" as in "region [axis]") (a "kind of" relationship). In this example, the productivity software 101 has also added a domain— "region"—and members of the domain (e.g., north). The productivity software 101 has also specified additional relationships between elements (block 504)—in this case an additional semantic relationship. Specifically, the productivity software 101 has added instructions indicating that airfare is not just a type of travel but also a numeric contributor to travel, i.e., that the value of travel should equal the summary of the values reported for its child elements. In other words, the productivity software 101 has added instructions regarding mathematical relationships. The meaning of the parent-child relationships in this hierarchical presentation may have a default semantic according to the syntax of the schema language, or can, in some embodiments, have another specified semantic. As a further example of the schema being extended to include an additional, specified semantic, an element could be extended to include a semantic for calculating a compound value for that element, e.g., a recipient requests travel budgets from 10 different providers, and the compound value would be the sum of those responses. Alternatively, the compound value may be a calculation of an average value or other function that operates on a set of numeric values. This may be presented within a data collection dashboard where a recipient can view the status of requests. e.g., 10 requests, 8 providers responded, and the compound value for each data point requested.

Figure 6:
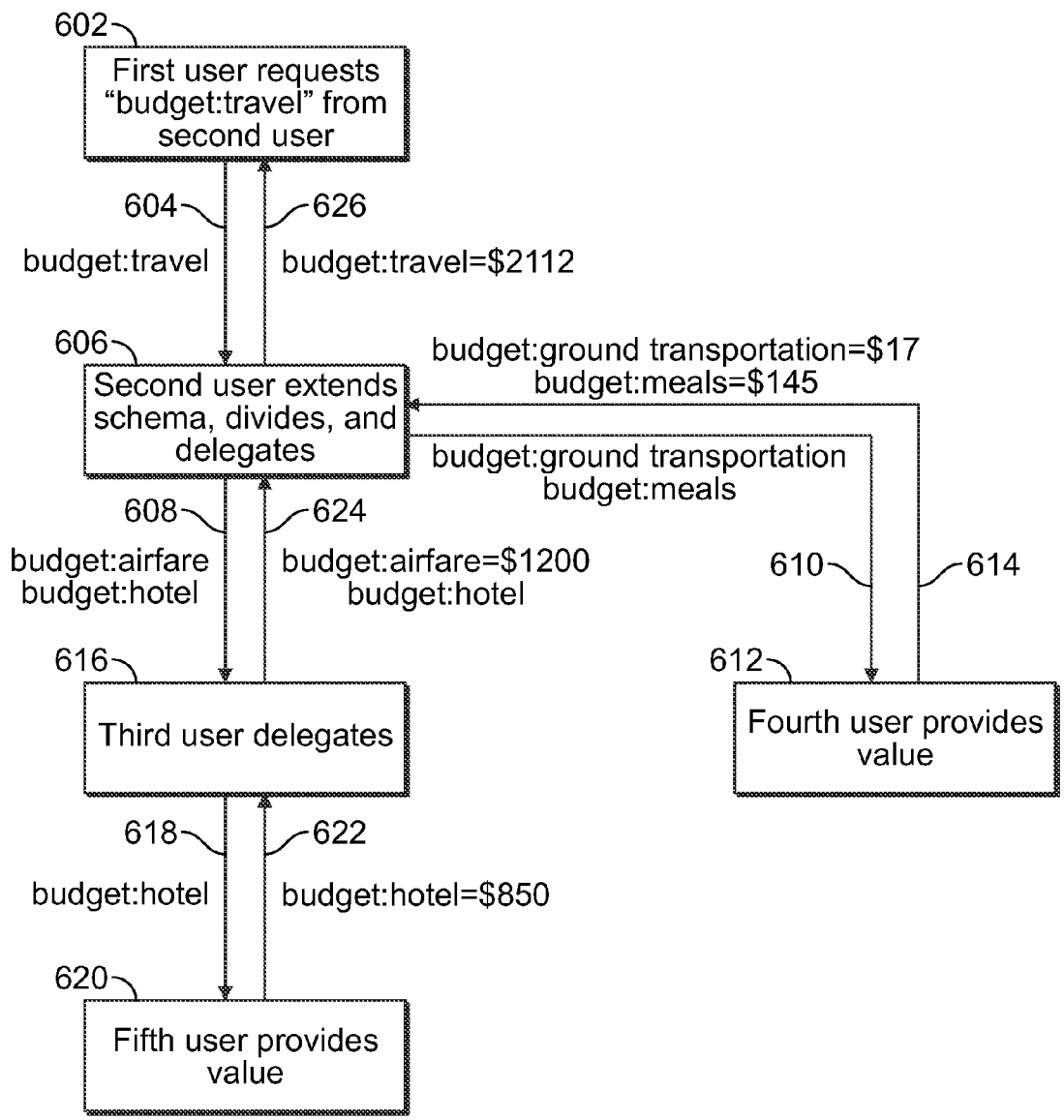
FIG. 6 depicts a data collection process according to still another embodiment.

Turning to FIG. 6, an example of how the productivity software 101 carries out data collection in an embodiment is described. It will be assumed in this example that the first user 116 needs to assemble a budget report and therefore needs to collect data from various members of his organization. At 602, the first user 116 requests a data collection for travel expenditures with the second user 118 being the provider identified for the data point. In doing so, the first user 116 interacts with the user interface, which was delivered to the first computing device 104 from the productivity software 101. The productivity software 101 instantiates the data collection template 144 using the first schema 138, and uses the budget:travel element to define the data point and instantiate the first data element 132. The productivity software 101 gives the travel expenditures data point the properties specified by first schema 138, instantiates the first asset 132 to hold a value for the travel expenditures data point. The productivity software 101 notifies the second user 118 and provides the template 144 to the second user 118 (arrow 604).

The second user 118 determines that the data point for which collection is being requested—budget:travel—is made up of the following values: airfare, hotel, ground transportation, and meals, which he does not have in his possession, but which he believes are available to the third user 120 (airfare and hotel) and the fourth user 122 (ground transportation and meals). At 606, the second user 118 interacts with the user interface representing the data collection template 144 to extend the first schema 138 to divide budget:travel into the four constituent parts and delegate the collection responsibility to the third user 120 (airfare and hotel) and to the fourth user 122 (ground transportation and meals). The second user 118 designates himself to be the approver for each of these constituent parts. The productivity software 101 responds by extending the schema 138 to include the block 504 (which includes instructions on the breakdown and summation of budget:travel). The productivity software 101 then notifies the third user 120 and fourth user 122 of the request, and notifies the first user 116 of the delegation of the request. The productivity software 101 transmits a visual representation of the template 144 to each of the third user 120 and the fourth user 122 (e.g., to each user's computing device when each respective user logs into the productivity software 101), as denoted by arrows 608 and 610. In doing so, the productivity software 101 customizes the visual representation for each of the third user 120 and fourth user 122. For example, the visual representation (e.g., web page) that the third user 120 receives will have data entry fields for airfare and hotel, but not for ground transportation and meals. Conversely, the visual representation that the fourth user 122 receives will have data entry fields for ground transportation and meals, but not for airfare and hotel. In some embodiments, the respective third and fourth users are only shown data fields corresponding to the data points for which he or she is responsible. In other embodiments, one or both users may see data fields corresponding to the other values, but only have the option to edit the entry field pertaining to the data point for which he or she is responsible.

In an embodiment, the productivity software 101 creates derivative versions of the template 144—one version 144a for the third user 120 (containing the data points budget:airfare and budget:hotel) and another version 144b (containing the data points budget:ground transportation and budget:meals) for the fourth user 122. The productivity software 101 transmits the visual representation of the first derivative version 144a to the third user 120 and transmits the visual representation of the second derivative version 144b to the fourth user 122.

At 612, the fourth user 122 enters the value "$17" for transportation and "$145" for meals. The fourth computing device 110 transmits these values back to the productivity software 101 (arrow 614).

The third user 120 determines that, although she has a value to provide for the airfare data point, the fifth user 124 is the person most knowledgeable about the hotel data point. Thus, at 616, the third user 120 interacts with the user interface (on the third computing device 108) to (a) enter a value of "$1200" for the airfare and (b) delegate the task of providing a value for the hotel data point to the fifth user 124. The process for carrying out this delegation may involve the same actions described above with respect to block 606, and the third user 120 makes herself the approver for the hotel data point. The productivity software 101 responds similarly. For example, the productivity software 101 creates another extended version 144c of the template 144, notifies the fifth user 124 of the data collection request of the third user 120, and, once the fifth user 124 opens the request (e.g., after logging in to the productivity software 101), transmits a visual representation of the extended version 144c to the fifth computing device 112 (arrow 618). The visual representation of the extended version 144c of the template will contain a data entry field for the hotel data point, but not for the other three data points under budget:travel.

At 620, the fifth user 124 interacts with the user interface on the fifth computing device 112 (i.e., the visual representation of the extended version 144c) to enter a value of "$850" for the hotel data point. The fifth computing device 112 transmits this value to the productivity software 101 (arrow 622), which, in turn, notifies the third user 120 of the response to the data point collection request and notifies the third user 120 of the need for approval of the response. The third user 120, upon opening the notification, approves the value for the hotel data point. The third computing device 108 transmits the airfare data point value to the productivity software 101 (arrow 624) and an indication of the third user's approval of the previously-submitted value for the hotel data point.

Once the productivity software 101 receives an indication that the third user 120 has approved the hotel data point value, the productivity software 101 notifies the second user 118 that a value for the hotel data point has been provided and is awaiting approval. Furthermore, once the third user 616 enters a value for the airfare data point, the productivity software 101 notifies the second user 118 that a value for the airfare data point has been provided and is awaiting approval. The productivity software 101 carries out a similar notification for the ground transportation data point and the meals data point once the fourth user 122 has entered values for them. The second user 118 in this example logs in to the productivity software 101 and approves all four of the values submitted for the four data points. The productivity software 101 responds to these approvals by summing the four values (based on the instructions of the first schema 138, which is now extended so that the block 504 of FIG. 5B is included), storing the sum ($2112) in the first data entity 132 as the value for the budget:travel data point (arrow 626) and notifying the first user 118 that the first user 118's data collection request has been responded to.

In some embodiments, the productivity software 101 grants the first user 116 access to view the values entered for the four sub-elements of the budget:travel data point. In other embodiments, the productivity software 101 does not allow such access.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope as set forth in the following claims. For example, the actions described in FIG. 3, FIG. 4, and FIG. 6 can be reordered in ways that will be apparent to those of skill in the art.

What is claimed is:

1. A method for carrying out data collection by a host computing device, the method comprising:
    receiving, from a first computing device, a data collection request of a first user, wherein the data collection request indicates a data point that is to be the subject of the data collection and identifies a second user as provider of a value for the data point, wherein characteristics of the data point are defined in a mark-up language schema;
notifying the second user of the data collection request;
receiving, from a second computing device and in response to the data collection request, a request of the second user for the data point to be assigned a plurality of categories;
in response to the request of the second user, extending the mark-up language schema to characterize the plurality of categories within the mark-up language schema;
receiving, from the second computing device, a request of the second user to forward the data collection request, wherein the forwarding request identifies a third user and indicates a category of the plurality of categories for which the third user is to be a provider for the data collection request; and
in response to the forwarding request notifying the third user of the forwarded request.

2. The method of claim 1, further comprising:
receiving, from the first computing device, an input of the first user indicating a placeholder in a document;
receiving, from a third computing device, a value of the indicated category from the third user in response to the forwarded request;
notifying the second user of the receipt of the value;
receiving an approval of the value from the second user; and
in response to the approval, populating the placeholder with the value.

3. The method of claim 2, wherein
receiving the input of the first user comprises receiving the first user's selection of one or more cells of a spreadsheet; and
populating the placeholder comprises populating the one or more cells with the value.

4. The method of claim 1, further comprising:
receiving, from a third computing device, a value of the indicated category from the third user in response to the forwarded request;
notifying the second user of the receipt of the value;
receiving an approval of the value from the second user;
in response to the approval, persisting the value in data entity corresponding to the data point in a memory accessible to the host computing device; and
notifying the first user of the approval.

5. The method of claim 4, further comprising tagging the value in accordance with the extended mark-up language schema.

6. The method of claim 1, further comprising:
receiving, from the second user, a denial of approval of the received value; and
notifying the third user of the denial.

7. The method of claim 6, further comprising:
receiving, from the second user, a note regarding the denial; and
notifying the first user of the denial and the note.

8. The method of claim 1, further comprising restricting the first user from accessing the value until an approval of the value is received from the second user.

9. The method of claim 1, further comprising:
receiving, from the third user, a value in response to the forwarded request;
gating the response of the third user conditioned on the approval of the second user;
if the host computing device receives an approval of the value from the second user, then providing the value to the first user; and
if the host computing device receives a denial of approval of the value from the second user, then withholding the response from the first user.

10. The method of claim 1, further comprising:
in response to the data collection request, updating a permission of a data entity corresponding to the first data point to allow the second user to edit the data entity; and
in response to the forwarding request, updating the permission of the data entity to allow the third user to edit the data entity.

11. The method of claim 1, wherein notifying the second user of the data collection request comprises:
posting a message on a data collection dashboard of the second user; and
providing the data collection dashboard to the second computing device.

12. The method of claim 1, wherein notifying the second user of the data collection request comprises:
posting a message on a data collection dashboard of the second user;
emailing a link to the data collection dashboard to the second user; and
providing the data collection dashboard to the second computing device in response to the second user activating the link.

13. The method of claim 1, further comprising:
transmitting, to the second computing device, a visual representation of a first data collection template;
in response to the forwarding request, creating a second data collection template that is based on the first data collection template; and
transmitting a visual representation of the second data collection template to the third user via a third computing device.

14. The method of claim 13, further comprising creating the first data collection template based on the mark-up language schema.

15. The method of claim 1, wherein the forwarding request further identifies a fourth user and indicates a second category of the plurality of categories that the fourth user is to be a provider for the forwarded request, the method further comprising:
transmitting, to the second computing device, a visual representation of a first data collection template that shows the category of data for which the third user is to be a provider, but not the category of data for which the fourth user is to be a provider;
in response to the forwarding request, creating a second data collection template that is based on the first data collection template; and
transmitting, to the fourth user via a fourth computing device, a visual representation of the second data collection template that shows the category of data for which the fourth user is to be a provider, but not the category of data for which the third user is to be a provider.

16. The method of claim 1, wherein the mark-up language schema is an extensible business reporting language schema.

17. The method of claim 1, wherein extending the mark-up language schema comprises adding a new neighbor element to the mark-up language schema based on at least one of the plurality of categories.

18. The method of claim 1, wherein extending the mark-up language schema comprises adding, to the mark-up language schema, a new child element that refines an existing element of the mark-up language schema based on at least one of the plurality of categories.

19. The method of claim 1, wherein extending the mark-up language schema comprises adding, to the mark-up language schema, a new element that groups together a plurality of existing elements of the mark-up language schema based on at least one of the plurality of categories.

20. The method of claim 1, wherein extending the mark-up language schema comprises adding, to the mark-up language schema, an additional semantic relationship between two or more elements of the mark-up language schema.

21. The method of claim 20,
wherein the forwarded request further identifies a fourth user and indicates a second category of the plurality of categories that the fourth user is to be a provider for the forwarded request,
wherein the additional semantic relationship is a semantic for calculating a compound value for the data point,
the method further comprising:
notifying the fourth user of the forwarded request;
receiving, from a fourth computing device, a value from the fourth user in response to the forwarded request; and
calculating a compound value of based on the value from the third user and the value from the fourth user in accordance with the semantic relationship.

22. The method of claim 21, wherein the compound value is a sum of the value from the third user and the value from the fourth user.

23. The method of claim 21, wherein the compound value is an average of the value from the third user and the value from the fourth user.

24. The method of claim 1, wherein the data collection request indicates a second data point for which the second user is to provide a value, the method further comprising:
receiving, from the second user, an indication that the second user has declined the data collection request as to the second data point.

25. A computing device comprising a memory and a hardware processor that carries out a data collection method, the method comprising:
receiving, from a first computing device, a data collection request of a first user, wherein the data collection request indicates a data point that is to be the subject of the data collection and identifies a second user as provider of a value for the data point,
wherein characteristics of the data point are defined in a mark-up language schema;
notifying the second user of the data collection request;
receiving, from a second computing device and in response to the data collection request, a request of the second user for the data point to be assigned a plurality of categories;
in response to the request of the second user, extending the mark-up language schema to characterize the plurality of categories within the mark-up language schema;
receiving, from the second computing device, a request of the second user to forward the data collection request, wherein the forwarding request identifies a third user and indicates a category of the plurality of categories for which the third user is to be a provider for the data collection request; and
in response to the forwarding request, notifying the third user of the forwarded request.

26. A non-transitory computer-readable medium having stored thereon computer-executable instructions for carrying out a method comprising:
receiving, from a first computing device, a data collection request of a first user, wherein the data collection request indicates a data point that is to be the subject of the data collection and identifies a second user as provider of a value for the data point,
wherein characteristics of the data point are defined in a mark-up language schema;
notifying the second user of the data collection request;
receiving, from a second computing device and in response to the data collection request, a request of the second user for the data point to be assigned a plurality of categories;
in response to the request of the second user, extending the mark-up language schema to characterize the plurality of categories within the mark-up language schema;
receiving, from the second computing device, a request of the second user to forward the data collection request, wherein the forwarding request identifies a third user and indicates a category of the plurality of categories for which the third user is to be a provider for the data collection request; and
in response to the forwarding request, notifying the third user of the forwarded request.

* * * * *